A. C. HERRON.
CAR-BRAKE.
No. 31,387.  PATENTED FEB. 12, 1861.
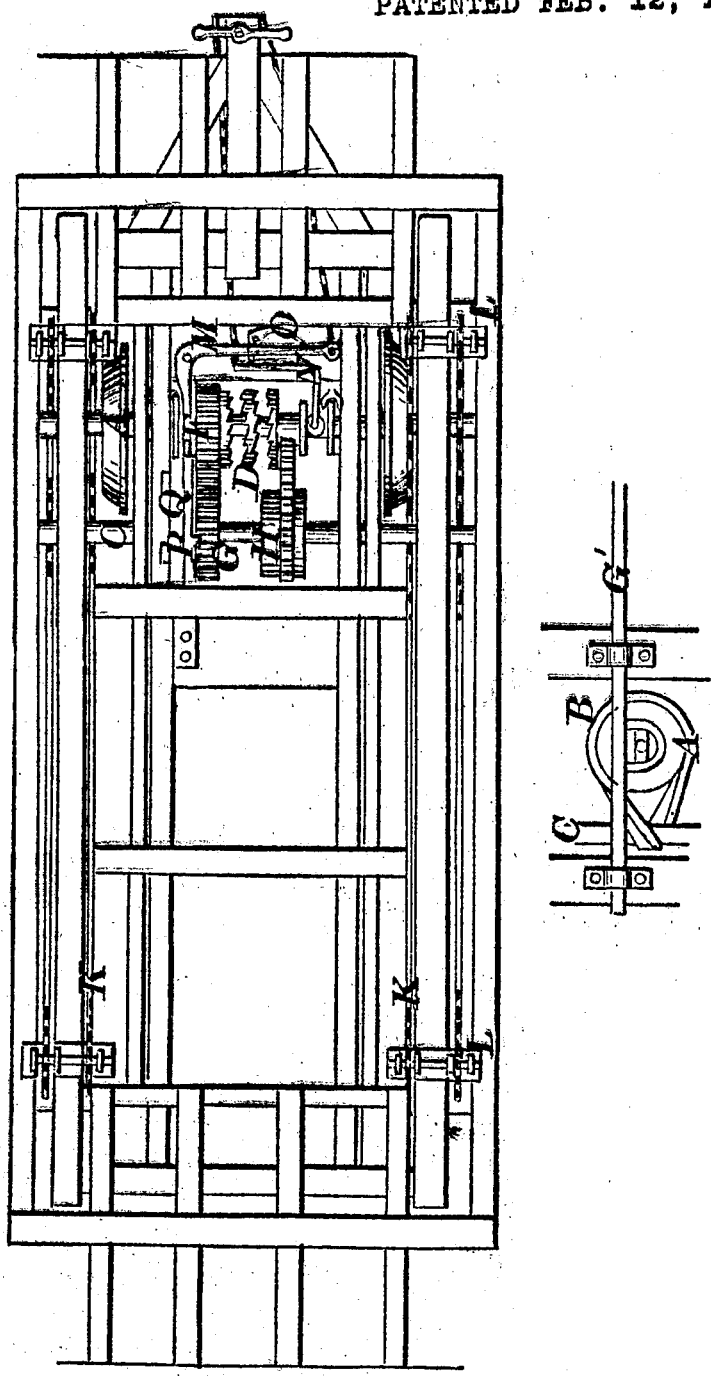
TAKEN FROM PATENT OFFICE REPORT.
1861 - VOL. II.
ONLY DRAWING ACCESSIBLE (1916).

UNITED STATES PATENT OFFICE.

ABIAL C. HERRON, OF WEST FARMS, NEW YORK.

CAR-BRAKE.

Specification of Letters Patent No. 31,387, dated February 12, 1861.

*To all whom it may concern:*

Be it known that I, ABIAL C. HERRON, of West Farms, Westchester county, in the State of New York, have invented a new new and useful Mode of Braking Cars; and I do hereby declare that the following is a full, clear, and exact description thereof, reference being had to the accompanying drawings and to the letters and marks thereon.

My invention consists in using the momentum of the car to elevate the car body and its contents and by the interposition of mechanical means between the body of the car and the axles of the truck to give forward motion to the car upon the descent of the body thereof.

In the accompanying drawings—No. 1, Figure 1, represents a perspective view of the lower part of a horse railroad car with the brake attached. A, represents the car wheels; B, the axles; C, is the shaft; D, is the stationary clutch made fast to the car axle; E, a clutch pulley; F, a gear with a clutch on one end; G, a gear made fast to the shaft C; H, is a pulley made fast to shaft C. The axle revolves in the pulley and gear E, and F. I, is a wide chain with one end of it fastened to the pulley on the shaft C. The other end of it is fastened to the clutch pulley on car axle B. J, represents the crooked irons through which the steady pins pass, and which connect the floor timbers with the car body, allowing them to rise and fall, without interfering with the timbers to which the pedestals are fastened; K, the chains with one end fastened to the shaft C, and the other end fastened to the crooked irons J; L, the rollers over which the chains pass; M, and N, are the shifters; O, is a sway bar connected with the shifters; P, is the hand upon the ratchet or wheel; Q, is the sway bar which raises the hand from the ratchet wheel; S, is a half pulley which is turned by the brakeman; T, T, are the chains, one end of them being attached to the shifters M, and N, and the other end is attached to the pulley S; U, is the shaft upon which the pulley S, is fastened; V, is a crank fastened to the upper end of shaft U, and which the brakeman takes hold of to operate the shifters. When it is desired to stop the car the brakeman turns the crank V, in the right direction to pull the shifter N, which moves the clutch pulley E, into mesh with the stationary clutch D, which causes the clutch pulley E, to revolve, and winding up the chain I, causes the pulley H to revolve with shaft C, and winds up the chains K, and raises the car body with the freight or passengers until the car stops. When it is desired to start the car, the brakeman turns the crank V, in a reverse direction to which he does in stopping;—said turning moves the shifter M, said shifter M, moves the clutch gear F into mesh with the stationary clutch D, and it moves at the same time the sway bar O, and sway bar O, moves the clutch pulley E, out of mesh. The sway bar Q is moved by a flange attached to the gear F. The sway bar Q raises the hand P from the spur gear G. When the said gear G is caused to revolve by the weight of the car body and freight or passengers, acting upon it through the instrumentality of the chains K, revolving the shaft C, with the wheel G, the wheel G being in mesh with the wheel F, and the wheel F being in mesh with the stationary clutch D, the car axle is caused to revolve by the running down of the car body in the same direction it was revolving before the car was stopped.

Drawing No. 1, Fig. 2, is a longitudinal representation of the horse car without the body, with the brake attached, and W represents the springs against which the crooked irons J rise to graduate the stopping of the car.

Drawing No. 1, Fig. 3, is a transverse section of drawing No. 1, Fig. 2, and X represents the springs under the crooked irons to prevent a sudden jerk when the clutch pulley is moved into mesh.

In the drawings of the steadying brake, represented in drawing No. 1, Fig. 2, a is an iron band or bar which is brought into contact with the car wheel to produce the friction necessary to steady the car; c is a cam which operates upon the band; d is a shaft upon which the cam c is fastened; e is a crank fastened to shaft d; f is an elbow, and g is a connecting rod with one end attached to elbow f, with a pivot and the other end attached to crank e in the same manner; n is a step with its lower end attached to elbow f with a pivot. When it is desired to steady the car on a descending grade the brakeman presses his foot upon step n, which moves elbow f and causes it to pull the crank e with connecting rod g; said pulling turns shaft d, and cam c pressing the band *a* against the car wheel producing the friction necessary to steady the car; *i* is a spring which raises the band *a* from the car wheel to prevent friction when it is not required.

Drawing No. 1, Fig. 4, represents an arrangement for holding clutch pulley E, in and out of gear, (mentioned in drawing No. 1, Fig. 2,) and A, is a sway bar and is moved by the flange on the clutch pulley E; B, is a spring which holds clutch pulley E, in and out of gear by pressing against the end of sway bar A; C is a pin to hold the end of spring B in its place.

In the accompanying drawings No. 2, Fig. 1, is a longitudinal representation of the steam car with the braking machinery attached thereto. A represents the car wheels; B the axles; C, D, E, are the gears on one side of the stationary clutch which perform the same office as pulleys and chain E, H, and I, in drawings No. 1, Fig. 1, horse car; F is a rack attached to the inclined planes which mesh into the pinions E, E; G represents heavy springs against which the inclined planes press in their forward movement; H is a scroll wheel against which the springs G are pressed and which the brakeman turns to govern the distance which the inclined planes may run, and which regulates the distance taken to stop the car; I, represents the sills to the car body; J, the inclined planes; K, the rollers under the inclined planes; L the rollers on the upper side of the inclined planes on which the car body rests; M is the frame which is attached by pins to the center of the frame work of each pair of trucks.

Drawing No. 2, Fig. 2, is a transverse representation of the car wheels and braking machinery. A represents the car wheels; B the axles; O, is the stationary clutch; C, C, are the clutch gears in which the axle revolves; D represents the intermediate gear; E and N are gears fastened to shaft P; E, E, are the pinions which mesh into the racks on the inclined planes; Q is a pulley fastened to shaft P, to which one end of the chains are fastened, and the other end of the chains being fastened to clutch pulleys on the other axles of the car connects them all together in the operation of braking; R is a stay which keeps the car body in its place while the inclined planes are moving forward.

Drawing No. 2, Fig. 3, is an upright representation of the regulator in its natural position. A is the pulley on which the band runs from the car axle to drive the regulator; B is the upright to the regulator; C, C, are the balls; D is the cylinder; E, E, are the cams; F is the circle around the upright attached to the shifter rod and which enables the cams to move the shifters; H, H, are arms on which the balls hang; G, G, are connecting rods with one end attached to a ring encircling a crevice in cylinder D, the other ends attached to the arms H, H, with pivots; I is a timber bolted to the frame of the trucks; J, is a bearing in which the upright is supported.

Drawing No. 2, Fig. 4, represents the lower part of the regulator, and shows the operation of the band by which it is driven; A is a pulley; B is a band connecting the regulator with the car axle C; D is the upright in a horizontal position; F is a circle around the upright; E, E, are the cams; G is the rod which moves the shifters.

And now having described my invention so as to enable any one acquainted with the art to construct the same, what I claim and desire to secure by Letters Patent is:

1. In combination with a car, the spur-gears and the clutches, C, C, F, N, D and O, the sway-bars, O, Q, the shifters, M, the rollers, L, the chains, K, and the hand P, or their equivalents, arranged as shown by Fig. 1, No. 1, and Fig. 2 No. 2, of the drawings, for the purposes herein specified.

2. The scroll-wheel H, in combination with the springs G, and the inclined planes F, F, or their equivalents for the purposes herein described.

3. The spring B, and sway-bar A, as shown by No. 1, Fig. 4, of the drawings, for the purposes set forth.

ABIAL C. HERRON.

Witnesses:
ROBERT H. CORBETT,
H. E. KLUGH.